Figure 3:
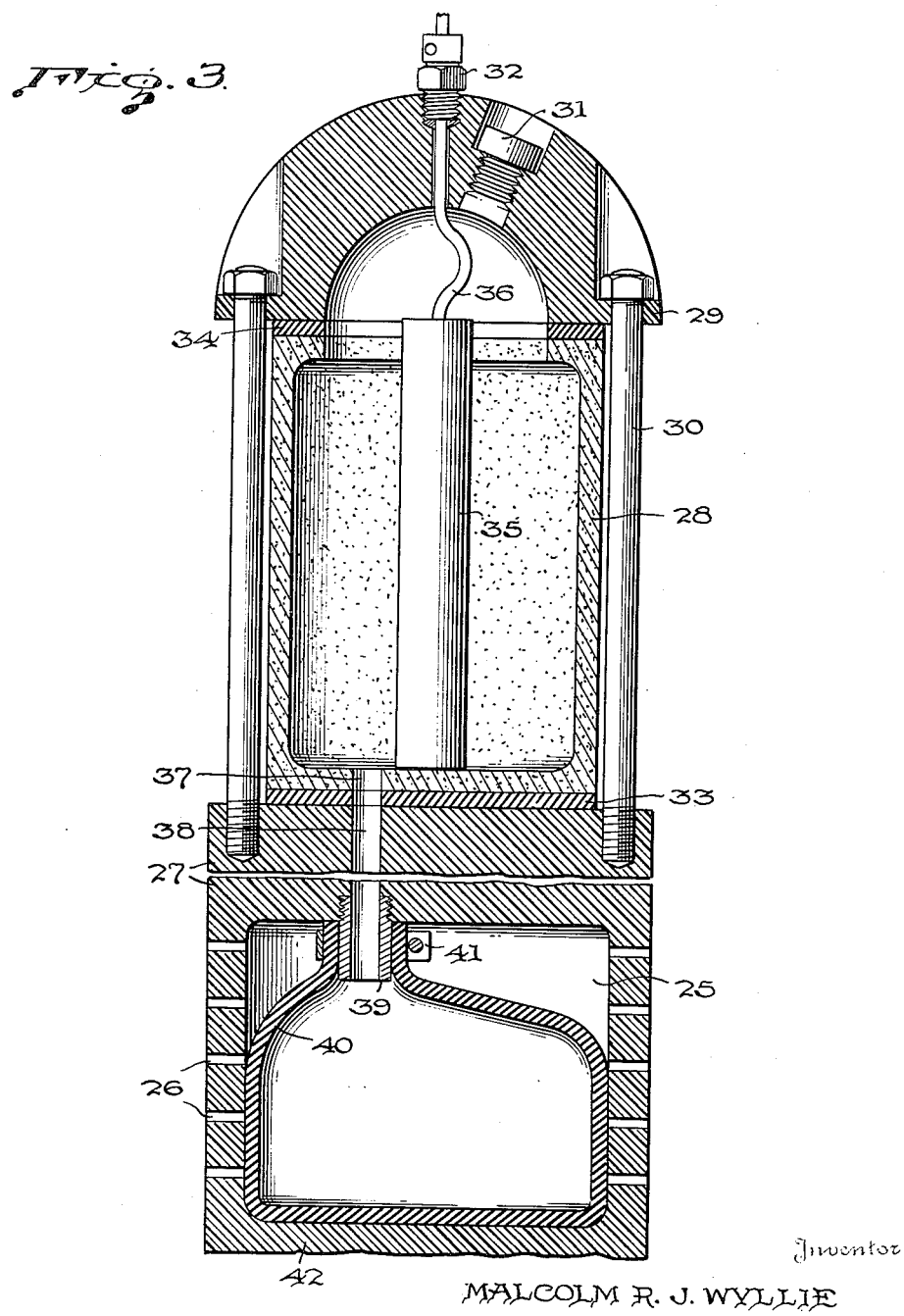

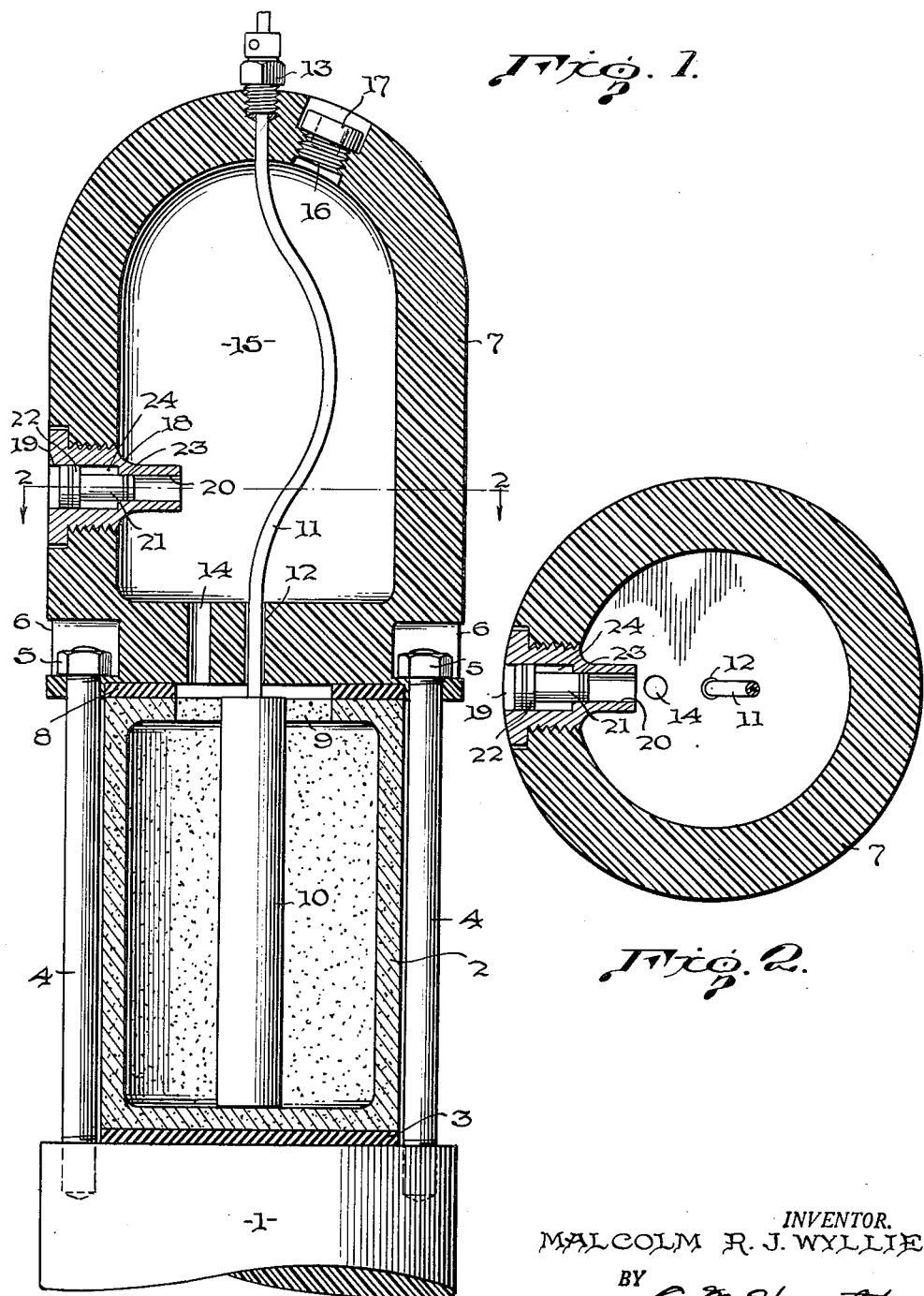

Inventor
MALCOLM R. J. WYLLIE

Patented Apr. 29, 1952

2,595,042

UNITED STATES PATENT OFFICE 2,595,042

NONPOLARIZING ELECTRODE FOR ELECTRIC LOGGING OF BOREHOLES

Malcolm R. J. Wyllie, Indiana Township, Allegheny County, Pa., assignor to Gulf Research & Development Company, Pittsburgh, Pa., a corporation of Delaware Application March 23, 1950, Serial No. 151,361

4 Claims. (Cl. 204—195)

This invention concerns an electrode for use in the electric logging of boreholes and in particular concerns a unique form of non-polarizing electrode containing a half cell and in which poisoning of the cell fluid by the well fluid is eliminated by maintaining the cell fluid at a pressure greater than that existing in the adjacent well fluid.

In the electric logging of boreholes it is customary to lower one or more electrodes into the well in order that electrical measurements may be made. These electrodes are exposed in the well to the aqueous well fluid through which electric contact is established to the adjacent formations exposed in the well.

One form of electric log which is customarily made is the so-called self-potential curve. In making a self-potential log the spontaneous potential difference is measured between an electrode on the surface of the ground and an electrode at various depths in the well. It is apparent that in order to make such measurements the two electrodes used must be of a non-polarizing type. The surface electrode of this type presents no particular difficulty, but serious difficulties are encountered with such an electrode in the well. The well electrode is subject at depth to hydrostatic pressures which may reach thousands of pounds per square inch. As a result of these high pressures the porous member which is usually a part of such a non-polarizing electrode may be broken. If the porous member is mechanically strong enough to resist the pressures, there may be forced through the porous element some of the well-fluid filtrate which then chemically poisons the electrolyte inside the electrode so that accurate readings of potential are no longer obtained. Both the mechanical difficulties and the danger of poisoning are eliminated by the electrode of my invention.

It is accordingly an object of my invention to provide a non-polarizing electrode for electric logging of boreholes by means of which accurate self-potential measurements may be made at depth in a fluid-filled well.

It is another object of my invention to provide a non-polarizing electrode for electric logging which is not subject to chemical poisoning by the well fluid.

It is another object of my invention to provide a non-polarizing electro-logging electrode which is not susceptible to leakage or invasion by the well fluid.

It is another object of my invention to provide a non-polarizing electrode for electric logging in which the ambient well-fluid pressure is substantially counterbalanced.

It is another object of my invention to provide a non-polarizing electrode for electric well logging in which the interior of the porous member carries a hydrostatic pressure slightly in excess of the ambient well-fluid pressure.

These and other useful objects are accomplished by the electrode of my invention described in this specification of which the drawing forms a part, and in which Figure 1 is a vertical section of one form of my electrode;

Figure 2 is a transverse section of the electrode of Figure 1 taken along the line 2—2; and Figure 3 is a vertical section of another form of my electrode.

Briefly stated, my invention comprises a non-polarizing electrode having a porous member filled with electrolyte and within which there is a standard half-cell. The outside of the porous member is exposed to well fluid under hydrostatic pressure. The electrolyte inside the porous member is connected to a reservoir containing the electrolyte, which electrolyte is in turn in pressure communication with the outside well fluid through a pressure-multiplying device so that the electrolyte is always maintained at a slightly higher hydrostatic pressure than that existing in the adjacent well fluid. Thus, all seepage of well fluid into the electrode is prevented. A small amount of outward leakage of electrolyte takes place from the interior of the electrode outward into the well bore. This however, does no harm and serves to keep the pores of the porous member free from clogging by the mud which is normally carried in the well fluid.

Referring to Figure 1, there is shown an electrode made according to the teaching of my invention attached to the upper end of a well-logging sonde 1. The sonde 1 may be simply a weight to cause the assembly to sink in the well, or it may comprise other well-logging equipment which does not form a part of this invention.

Attached to the upper end of the sonde 1 is a porous container 2 in the form of a cup or pot. The porous container 2 may be made of inert material such as unglazed porcelain or porous alundum. The top of porous cup 2 is open as shown at 9. A layer of electrically-insulating material 3 separates the bottom of the porous cup 2 from the apparatus 1. The porous cup is held in position by means of insulated bolts 4. The bolts may have their surface insulated as by a layer of insulating paint or a thin rubber sleeve (not shown). The nuts 5 at the top of bolts 4 may fit into recesses 6 milled into the sides of an upper hollow chamber 7 further to be described and whose purpose will become evident later. An insulating gasket 8 is clamped between the top of porous cup 2 and the bottom of chamber 7.

In the center of the porous cup 2 is located a non-polarizing half-cell 10 which is reversible with respect to the chloride ion. The half-cell 10 may take the form of mercury/mercury-chloride, silver/silver-chloride, lead/lead-chloride, or other well-known type, and per se forms no part of this invention. The required size of the half-cell 10 is determined by the required electrically-conducting area which depends on the amount of anode current to be passed through the electrode system. For example, the mercury/mercury-chloride electrode requires 1 sq. cm. of area on the cylindrical surface of the half-cell 10 for every 15 microamperes of current passing through the electrode. This characteristic of such electrodes is well known. The half-cell 10 is connected to insulated wire lead 11 which passes through an opening 12 in the bottom of chamber 7 and continues through a stuffing box or seal 13 at the top of chamber 7 and up to the surface of the ground through a hoisting cable (not shown) carrying one or more insulated electric conductors for this purpose as is customary in electric-logging apparatus.

The porous container 2 is filled with a saturated solution of potassium chloride which is fed from chamber 7 to the porous cup 2 through the opening 14 connecting the interior of chamber 7 with the interior of the porous cup 2. The chamber 7 is made of electrically-insulating material such as Bakelite. The reservoir space 15 inside the chamber 7 serves as a source of supply of potassium-chloride solution. A filler plug 16 is threaded into the wall of chamber 7 with its head 17 recessed in the side of chamber 7 as indicated. It is convenient to have the filler plug opening at the highest point when filling the assembly in order that no air will be entrapped inside the device when it is filled with potassium-chloride solution.

In order to maintain the pressure on the potassium chloride inside chamber 15 and inside porous cup 2 at a pressure which exceeds slightly the ambient well fluid pressure, I provide a pressure-adjusting device 18 mounted as by threads in the wall of the chamber 7. Pressure-adjusting device 18 comprises a pair of cylinders 19 and 20, the inner of which 20 is slightly smaller in diameter than the outer one 19. A freely-sliding piston unit 21 is provided in the pressure-adjusting device. Piston unit 21 comprises piston 22 slidably sealed in cylinder 19 and to this piston is connected a plunger which acts as a smaller piston 23 slidably sealed in the smaller cylinder 20. Each piston is provided with one or more piston rings in order to provide a tight seal in its respective cylinder. No liquid is contained in the space 24 behind the piston 22 in order that this piston may freely slide in cylinder 19. It is thus apparent that the pressure of the ambient well fluid develops a force on piston 22 and this force is transmitted to the plunger 23 which develop a pressure in the potassium-chloride solution confined in the reservoir 15 and porous cup 2. Inasmuch as piston 23 is smaller in area than piston 22, the pressure on the potassium-chloride solution is always automatically maintained at a pressure which is greater than the hydrostatic head of fluid in the adjacent borehole, thus insuring a constant small leakage of potassium-chloride solution outward through the pores of porous cup 2 and thereby preventing any entrance of well fluid into the porous cup 2. This effectively prevents contamination of the electrode 10 by well fluid, and also prevents plugging of the pores of the cup 2 which would take place if well fluid were permitted to flow into porous cup 2. Furthermore, the pressure which must be withstood by the porous cup 2 is merely the differential pressure developed by the pressure-adjusting device 18.

Figure 3 shows an alternative form of my invention which accomplishes the same purpose in another manner. In Figure 3 the top of the well-logging sonde 42 contains a chamber 25 to which the well fluid has access through the perforations 26. The body of the sonde extends above the chamber 25 in a continuation 27 of substantial length, for example the section 27 may be several feet in length. At the top of section 27 is mounted a porous container 28 made of unglazed porcelain, porous alundum or the like, similar to that used in Figure 1. The porous cup 28 is clamped between the upper body 27 of the sonde and a cap 29, the cap being held in place by means of bolts 30 whose surface is insulated as by the application of an insulating paint or by a thin rubber sleeve (not shown). The cap 29 may be made of electrically-insulating material, such as Bakelite and is equipped with a filler plug 31 and a cable seal or stuffing box 32. Electrically-insulating gaskets 33 and 34 are placed below and above the porous cup 28 and these gaskets also serve to protect the cup from mechanical damage in clamping. A half-cell 35, similar in all respects to 10 of Figure 1, is placed within the porous cup 28 and connected by means of insulated wire lead 36 passing through seal 32 to the surface of the ground through a hoisting cable (not shown).

The bottom of the porous cup 28 has an opening 37 and communicates with chamber 25 through a hole 38 in the top section of the sonde. A short nipple 39 may be screw-threaded into the wall of the hole 38 so that the nipple protrudes into chamber 25. The interior of chamber 25 contains a deformable bag 40 which may be of synthetic rubber or the like, and whose mouth is securely held on nipple 39 by means of hose clamp 41. The space inside of the porous cup 28 is thus in communication with the interior of the bag 40 and this entire space is filled with potassium-chloride solution which may be introduced through the filler plug 31.

When the apparatus of Figure 3 is immersed in a well which contains drilling fluid, a pressure differential will be set up between the inside and outside of porous cup 28. This pressure differential is set up by the difference in density of the column of saturated potassium-chloride solution inside the apparatus and the column of drilling fluid of equal height outside the apparatus. Inasmuch as the density of drilling mud is always greater than the density of saturated potassium-chloride solution, the pressure at the bag 40 due to the mud column always exceeds that due to the potassium-chloride column. Consequently there will be a tendency of the drilling mud pressure acting on deformable container 40 to force potassium-chloride solution outward through the porous cup 28 and thereby prevent any entrance of well fluid into the porous cup 28. It is apparent also that the mechanical pressure to which the porous cup 28 is subjected is merely the differential pressure set up due to the difference in density between the mud outside the system and the potassium-chloride solution inside the system. In Figure 3 the deformable container 40 is in the nature of an impervious bag but other forms of deformable container may be used as for example a bellows or a cylinder with a freely-movable piston.

While I have indicated that my invention is useful in making the so-called self-potential log, the electrode may also be used in other logging operations in which it is desired to make reversible contact with the fluid in the borehole or the adjacent formation.

What I claim as my invention is:

1. A non-polarizing electrode for use in electric well logging which comprises an inert porous container, a deformable reservoir in communication with the interior of said porous container and located at a lower level than said porous container, an electrolye in said porous container and in said deformable reservoir, a half-cell immersed in the electrolyte in said container, said half-cell being reversible with respect to an ion of said electrolyte, and an insulated electrical connection to said half-cell.

2. A non-polarizing electrode for use in electric well logging which comprises an inert porous container, a deformable container depending from said porous container, a conduit connecting the interior of said containers, an electrolyte in the interior of said containers, a half-cell immersed in the electrolyte in said porous container, said half-cell being reversible with respect to an ion of said electrolyte, and an insulated electrical connection to said half-cell.

3. A non-polarizing electrode for use in electric well logging which comprises an inert porous container, a deformable container depending from said porous container, a conduit connecting the interior of said containers, saturated aqueous potassium-chloride solution in the interior of said containers, a half-cell immersed in the potassium-chloride solution in said porous container, said half-cell being reversible with respect to the chloride ion, and an insulated electrical connection to said half-cell.

4. A non-polarizing electrode for use in electric well logging which comprises an inert porous container, a deformable container depending from said porous container, the interior of said containers being in communication, a saturated aqueous potassium-chloride solution in the interior of said containers, a half-cell immersed in the potassium-chloride solution in said porous container, said half-cell being reversible with respect to the chloride ion, and an insulated electrical connection to said half-cell.

MALCOLM R. J. WYLLIE.

REFERENCES CITED

The following references are of record in the file of this patent:

UNITED STATES PATENTS

| Number | Name | Date |
| --- | --- | --- |
| 1,569,143 | Robinson | Jan. 12, 1926 |
| 2,070,912 | McDermott | Feb. 16, 1937 |
| 2,168,867 | George | Aug. 8, 1939 |
| 2,190,835 | Gruss et al. | Feb. 20, 1940 |
| 2,311,976 | Coleman | Feb. 23, 1943 |

FOREIGN PATENTS

| Number | Country | Date |
| --- | --- | --- |
| 388,428 | Italy | Mar. 31, 1936 |